(12) United States Patent
Xing et al.

(10) Patent No.: US 9,920,515 B2
(45) Date of Patent: Mar. 20, 2018

(54) THERMOPLASTIC POLYOLEFIN MEMBRANE WITH ENHANCED THERMAL RESISTANCE

(75) Inventors: Linlin Xing, Wayne, NJ (US); Thomas J. Taylor, Valley Cottage, NY (US)

(73) Assignee: Building Materials Investment Corporation, Wilmington, DE (US)

( * ) Notice: Subject to any disclaimer, the term of this patent is extended or adjusted under 35 U.S.C. 154(b) by 0 days.

(21) Appl. No.: 13/701,770

(22) PCT Filed: Aug. 9, 2011

(86) PCT No.: PCT/US2011/047039
§ 371 (c)(1),
(2), (4) Date: Jan. 14, 2013

(87) PCT Pub. No.: WO2012/021489
PCT Pub. Date: Feb. 16, 2012

(65) Prior Publication Data
US 2013/0130581 A1    May 23, 2013

Related U.S. Application Data

(60) Provisional application No. 61/372,066, filed on Aug. 9, 2010.

(51) Int. Cl.
*E04B 1/76* (2006.01)
*E04D 5/06* (2006.01)
(Continued)

(52) U.S. Cl.
CPC ............ *E04B 1/7608* (2013.01); *B32B 5/028* (2013.01); *B32B 27/12* (2013.01); *B32B 27/18* (2013.01);
(Continued)

(58) Field of Classification Search
CPC ........ B32B 2307/3065; B32B 2419/06; B32B 27/08; B32B 27/12; B32B 2264/10;
(Continued)

(56) References Cited

U.S. PATENT DOCUMENTS 4,209,430 A * 6/1980 Weber .......................... 524/497
4,368,228 A * 1/1983 Gorgati ........................ 428/110
(Continued)

FOREIGN PATENT DOCUMENTS

FR    2796974 A1    2/2002
GB    1172167 A     11/1969

OTHER PUBLICATIONS

International search report of published PCT WO/2012/021489A1 (parent application) dated Dec. 20, 2011.
(Continued)

*Primary Examiner* — Jennifer A Steele
(74) *Attorney, Agent, or Firm* — Baker & McKenzie LLP

(57) ABSTRACT

Disclosed herein are thermoplastic olefin (TPO) membranes with enhanced thermal resistance. In an embodiment, the disclosed may include a cap layer, a core layer, and a scrim layer disposed therebetween. The cap layer may be formulated with TPO resins and a UV stabilizer package comprising ultrafine $TiO_2$. The UV stabilizer package may further comprise various other additives, including a UV stabilizer, an antioxidant, a process or thermal stabilizer, and/or a UV absorber.

20 Claims, 1 Drawing Sheet

(51) Int. Cl.
  *B32B 5/02* (2006.01)
  *B32B 27/18* (2006.01)
  *B32B 27/32* (2006.01)
  *B32B 27/12* (2006.01)
  *C08L 9/00* (2006.01)
  *C08L 19/00* (2006.01)
  *C08L 23/12* (2006.01)
  *C08K 3/22* (2006.01)
  *C08K 5/3435* (2006.01)
  *C08L 23/10* (2006.01)

(52) U.S. Cl.
  CPC .............. *B32B 27/32* (2013.01); *C08L 9/00* (2013.01); *C08L 19/00* (2013.01); *C08L 23/10* (2013.01); *C08L 23/12* (2013.01); *E04D 5/06* (2013.01); *B32B 2262/0276* (2013.01); *B32B 2307/306* (2013.01); *B32B 2419/06* (2013.01); *C08K 5/3435* (2013.01); *C08K 2003/2237* (2013.01); *Y10T 442/10* (2015.04)

(58) Field of Classification Search
  CPC ........... B32B 2270/00; B32B 2274/00; B32B 2305/18; B32B 2307/31; B32B 2307/71; B32B 27/20; B32B 5/024; C08L 23/10; C08L 23/16; C08L 19/00; C08L 23/12; C08L 9/00; C08K 2003/2237; C08K 5/3435; E04D 5/06; E04D 5/10; E04D 5/12; E04D 2001/005; F28D 20/023; Y02B 80/34; B29C 65/00; B29C 65/5057; B29C 65/525
  USPC ........... 442/1, 2, 15, 16, 44, 62–75; 156/60, 156/166, 157
  See application file for complete search history.

(56) References Cited

U.S. PATENT DOCUMENTS

| | | | |
|---|---|---|---|
| 4,937,274 A * | 6/1990 | Arima | C09D 5/38 106/403 |
| 5,468,550 A | 11/1995 | Davis et al. | |
| 5,523,357 A | 6/1996 | Peterson | |
| 6,632,509 B1 | 10/2003 | Davis et al. | |
| 6,750,284 B1 * | 6/2004 | Dharmarajan et al. | 524/515 |
| 2004/0033741 A1 * | 2/2004 | Peng | 442/38 |
| 2004/0053067 A1 * | 3/2004 | Dharmarajan et al. | 428/521 |
| 2004/0157075 A1 | 8/2004 | Yang | |
| 2007/0193167 A1 | 8/2007 | Bruce et al. | |
| 2008/0008858 A1 | 1/2008 | Hong et al. | |
| 2008/0050559 A1 | 2/2008 | Khan | |
| 2008/0179574 A1 | 7/2008 | Yana | |
| 2011/0151244 A1 * | 6/2011 | Wu et al. | 428/325 |
| 2013/0065021 A1 * | 3/2013 | Edison et al. | 428/149 |

OTHER PUBLICATIONS

European search report from European patent application EP11816905 dated Apr. 4, 2014.

Xing, Linlin and Taylor, Thomas J. "Correlating Accelerated Laboratory, Field, and Thermal Aging TPO Membranes", Journal of ASTM International vol. 8, No. 8, Paper JAI103743, Jul. 2011.

Examination Report issued by European Patent Office in European application No. 11816905.1, dated Dec. 9, 2016.

Office Action dated Oct. 31, 2017 in connection with Canadian Application No. 2,806,240, 4 pages.

\* cited by examiner

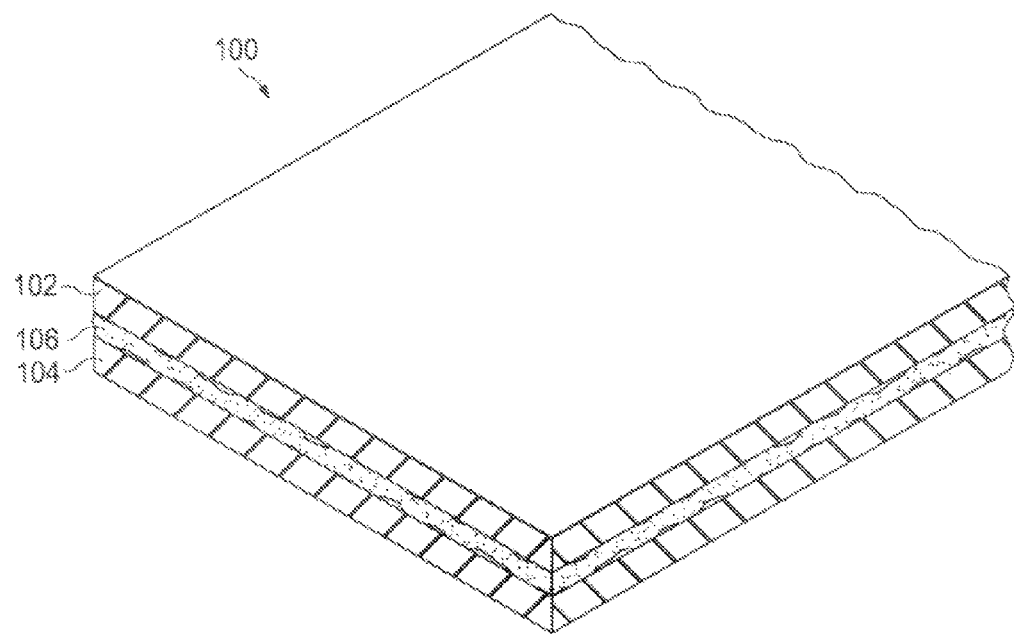

THERMOPLASTIC POLYOLEFIN MEMBRANE WITH ENHANCED THERMAL RESISTANCE

CROSS-REFERENCE TO RELATED APPLICATIONS

The present application is a 35 U.S.C. 371 application and claims priority to co-pending International Application No. PCT/US2011/047039, filed Aug. 9, 2011 entitled "Thermoplastic polyolefin membrane with enhanced thermal resistance" which claims priority to U.S. Provisional Patent Application Nos. 61/372,066, filed Aug. 9, 2010 and 61/429,293, filed Jan. 3, 2011 entitled "Thermoplastic polyolefin membrane with enhanced thermal resistance," all of which are incorporated herein by reference in their entirety as if set forth in full.

TECHNICAL FIELD

This invention relates generally to roofing products, and more particularly to roofing membranes and geomembranes formulated to have enhanced thermal resistance.

BACKGROUND

Thermoplastic polyolefin (TPO) based roofing membranes are one of many types of roofing membranes available on the market today. TPO may be a melt blend or reactor blend of a polyolefin plastic, such as a polypropylene polymer, with an olefin copolymer elastomer (OCE), such as an ethylene-3Q propylene rubber (EPR) or an ethylene-propylene-diene rubber (EPDR). Examples of commercially available TPO membranes include SURE WELD™ (Carlisle Inc.), GENFLEX™ (Omnova Solutions, Inc), ULTRA-PLY™ (Firestone Building Products) and EVERGUARD TPO™ (OAF). Novel stretchable TPO membranes are disclosed in U.S. Pat. No. 7,666,491, which is incorporated by reference herein.

TPO based membranes may also be used as geomembranes to cover landfills, storage ponds of water, and the like. Such TPO membranes may have a higher polypropylene content than a similar TPO roofing membrane and sometimes they are referred to as fPP (flexible polypropylene) membranes or sheets.

TPO-based roofing membranes may comprise one or more layers. A TPO membrane may comprise base-(bottom) and cap-(top) layers with a fiber reinforcement scrim (middle) sandwiched between the other two layers. The scrim may be a woven, nonwoven, or knitted fabric composed of continuous strands of material used for reinforcing or strengthening membranes. The scrim is generally the strongest layer in the composite. The fabric can contribute significantly to the tensile strength of the roofing membrane and provide for dimensional stability. In an example, the fabric reinforcement comprises a polyester yarn based scrim. Glass fiber based scrims may also be used for situations where additional weight and/or improved dimensional stability are desired.

BRIEF SUMMARY

An exemplary embodiment of a thermoplastic polyolefin composition may include a thermoplastic polyolefin resin and a UV stabilizer package comprising 0.001 weight percent to 3 weight percent ultrafine titanium dioxide. In an embodiment, the UV stabilizer package may comprise from 0.5 weight percent to 2 weight percent ultrafine titanium dioxide. In an exemplary embodiment, the UV stabilizer package may comprise from 1.5 weight percent to 2 weight percent ultrafine titanium dioxide.

According to an embodiment of the present disclosure, a thermoplastic polyolefin roofing membrane may comprise a cap layer made of a first thermoplastic polyolefin composition, the first thermoplastic polyolefin composition comprising thermoplastic polyolefin resins and a UV stabilizer package. The disclosed roofing membrane may also include a core layer made of a second thermoplastic polyolefin composition and a scrim layer disposed between the cap layer and the core layer. In an embodiment, the UV stabilizer package of the first thermoplastic polyolefin composition comprises from 0.001 weight percent to 3 weight percent ultrafine titanium dioxide.

According to an embodiment of the present disclosure, a method of manufacturing a thermoplastic polyolefin membrane may include providing a first thermoplastic polyolefin mixture comprising a thermoplastic polyolefin resin and a UV stabilizing package comprising 0.001 weight percent to 3 weight percent ultrafine titanium dioxide. The disclose method may further include extruding a first thermoplastic polyolefin layer from the first thermoplastic polyolefin mixture.

BRIEF DESCRIPTION OF THE DRAWINGS

FIG. 1 illustrates a perspective, side view of an exemplary TPO membrane in accordance with the present disclosure.

DETAILED DESCRIPTION

FIG. 1 is a perspective, side view of a portion TPO membrane 100. The TPO membrane 100 comprises a cap layer 102 and a core layer 104. A scrim layer 106 is substantially sandwiched between the cap layer 102 and the core layer 104. Each of the cap layer 102 and core layer 104 is made of a TPO sheet. When installed on the roof of a house, the TPO membrane 100 may be oriented such that the cap layer 102 is facing upward toward the direction of sunlight and the core layer 104 is facing downward toward the roof. As such, the cap layer 102 may be formulated with additives such as UV stabilizers, UV absorbers, antioxidants, process and thermal stabilizers, fire retardants, white pigments or color pigments, and any other additives known in the art. The formulation of the cap layer 102 may provide for long-term stability in an outside environment and provide an aesthetic appearance if containing color pigments. While the core layer 104 may be formulated to include additives, the core layer 104 may be configured to include no additives to reduce costs. In embodiments in which the core layer 104 includes additives, the formulation for the core layer 104 may be the same as the formulation for the cap layer 102. In another embodiment in which the core layer 104 includes additives, the formulation for the core layer 104 may be different from the formulation for the cap layer 102.

A method of preparing TPO membrane 100 may comprise first mixing the additives with TPO to effect a desired formulation and forming a sheet of TPO by extrusion. As such, the additives may be distributed throughout the TPO sheet. To form the TPO membrane 100, scrim 106 may be disposed between the TPO sheets 102 and 104, and the three layers may be laminated together at an elevated temperature such that the two TPO layers 102 and 104 are fused and welded together through the interstices of the scrim 106.

Due to the rising energy cost, installing solar panels over a commercial roof may provide significant energy saving for the building owner. Solar panels may be rigid solar panels as well as flexible solar panels. Flexible solar panels may be installed on the roof by directly laminating the backside of the solar panels to the top side of roofing membranes. A significant amount of heat may be generated by the solar panels, especially if they have dark colors. The heat in turn may be transferred to the surface of roofing membranes that are underneath of the flexible solar panels. Consequently, the surface temperature of roofing membranes underneath the solar panels can reach over 200 F in hot climates. In a similar manner, geomembranes may have flexible solar panels laminated or otherwise attached to their cap layers.

In embodiments in which the TPO membrane 100 is installed on the roof, a flexible solar panel (not shown) may be laminated to the cap layer 102 of the TPO membrane 100. As such, the cap layer 102 may be subject to the heat generated by the solar panel. Evan without a flexible solar panel installed over the TPO membrane 100, the absorption of intense light during the summer can also subject the TPO membrane 100 to a high temperature.

A disadvantage of conventional TPO roofing membranes is that they are designed to withstanding field temperature below 180 F. If TPO roofing membranes are exposed to a field temperature higher than 180 F for an extended period (such as a couple of years), the TPO membranes may degrade quickly due to UV radiation along with thermal-oxidative degradation caused by high-temperature exposure. Such degradation may lead to surface cracking of the TPO membranes and therefore premature field failure or roof leaking.

The cap layer 102 and core layer 104 of the TPO membrane 100 may be formulated to include TPO resins. Additives may be included in the TPO cap layer 102 to enhance the resistance to degradation. In some embodiments, additives may also be included in the TPO core layer 104. Suitable additives may include a UV stabilizer package. A UV stabilizer package may include any combination of one or more below ingredients: 1) UV stabilizers functioning as free radical scavengers (e.g., Tinuvin XT-850, which is a Hindered Amine Light Stabilizer ("HALS")); 2) antioxidants functioning as inhibitors of thermo-oxidative degradation at a broad temperature range for long-term thermal stabilizers (e.g., Irganox 1010, which is a sterically hindered phenolic antioxidant); 3) process or thermal stabilizers functioning as inhibitors of thermo-oxidative degradation during extrusion process (e.g., Irgastab FS301, which is a system comprised of a phosphate processing stabilizer Irgafos 168 and a high molecular weight hydroxylamine Irgastab FS042); and/or 4) UV absorber functioning to absorb UV light and dissipate it as thermal energy (e.g., Tinuvin 328, which is 2-(2H-benzotriazol-2-yl)-4,6-ditertpentylphenol).

In addition to a UV stabilizer package, the TPO cap layer 102 and/or core layer 104 may further include other additives. For example, the formulation for TPO cap layer 102 and/or core layer 104 may include rutile titanium dioxide ($TiO_2$) and at least one fire retardant. In an embodiment, the formulation for TPO cap layer 102 may include 1-10 weight percent rutile $TiO_2$. In another embodiment, the formulation for TPO cap layer 102 may include 2-4 weight percent rutile $TiO_2$. The use of $TiO_2$ in a pigment package has been described in U.S. Patent Pub. No. 2008/0050559, which is incorporated by reference herein. $TiO_2$ may also be included in a UV stabilizer/antioxidant package as described in U.S. Patent Pub. No. 2004/0157075, which is incorporated by reference herein.

One of ordinary skill in the art would appreciate the difference in particle size between rutile $TiO_2$ and ultrafine $TiO_2$, such as the DuPont™ Light Stabilizer 210 ("DLS 210"), which in some embodiment may have a mean particle size of 130 nm. By comparison, rutile $TiO_2$ generally has a mean particle size ranging from around 250 nm or more.

A surprising benefit of including ultrafine $TiO_2$ in a TPO formulation is an unexpected improvement in heat resistance. Disclosed in the present disclosure are surprising heat resistance data observed in TPO formulations comprising ultra fine $TiO_2$ together with other UV stabilizer package components. According to an embodiment of the present disclosure, an exemplary heat-resistant TPO formulation comprises TPO resins and a UV stabilizer package that includes 0.001 to 3 weight percent ultrafine $TiO_2$. The exemplary heat-resistant TPO formulation may further comprise rutile $TiO_2$ and a fire retardant. In addition to the ultrafine $TiO_2$, the UV stabilizer package in the heat resistant formulation may include any suitable components described in the present disclosure. In an embodiment, the UV stabilizer package may include Tinuvin XT-850, Tinuvin 328, Irgastab FS301. In another embodiment, UV stabilizer package may include Tinuvin XT-850, Tinuvin 328, Uvasorb HA88FD (a HALS), Irgastab FS301, and Irganox 1010. It is to be appreciated that various combinations of UV stabilizer packages components in various amounts may be used together with ultrafine $TiO_2$ to provide various heat-resistant TPO formulations in accordance with the principles of the present disclosure.

An exemplary heat-resistant formulation according to the present disclosure is provided in Table 1 below, and the heat resistance of such a formulation is compared to that of comparative examples A, B, and C. Based on these four different TPO formulations for the cap layer 102, four different test TPO membranes were prepared. Each test TPO membrane has a thickness of 80 mm. All four illustrative formulations include TPO resins and 3% rutile $TiO_2$. The heat-resistant formulation 1 includes a UV stabilizer package comprising 2% DLS 210, along with 1.7% Tinuvin XT-850, 0.5% Tinuvin 328, and 0.5% Irgastab FS301. The UV stabilizer package in comparative example A includes only 2% DLS 210 without additional additives. Compared to the novel UV stabilizer package in the heat-resistant formulation 1, the UV stabilizer package in comparative example B does not include any ultrafine $TiO_2$ but is otherwise the same. Compared to the novel UV stabilizer package in the heat-resistant formulation 1, the UV stabilizer package in comparative example C does not include any ultrafine $TiO_2$ but includes an additional 0.25% of Irganox 1010.

The test TPO membranes were tested according to the 280 F oven test method, which comprises the following steps: 1) set the oven temperature to 280 F for a forced air oven which is well calibrated; 2) put 1 by 2.75 inch piece of the test TPO membrane into the oven; 3) after oven aging for a time period, take the sample out of the oven to cool it down to room temperature; 4) wrap the sample around 3 inch mandrel to examine the TPO cap layer side to see if there are visible cracks under 10× magnification; and 5) if there is visible cracks under 10× magnification, record numbers of days the TPO sample being aged inside of 280 F oven.

TABLE 1

Thermal Resistance of 80 mil TPO Membrane

|  | Heat-resistant Formulation 1 | Comparative Example-A | Comparative Example-B | Comparative Example-C |
|---|---|---|---|---|
| Cap Layer Compositions | TPO resins 3% Rutile $TiO_2$ Fire retardant Novel UV stabilizer package | TPO resins 3% Rutile $TiO_2$ Fire retardant UV stabilizer package-A | TPO resins 3% Rutile $TiO_2$ pigment Fire retardant UV stabilizer package-B | TPO resins 3% Rutile $TiO_2$ pigment Fire retardant UV stabilizer package-C |
| UV stabilizer package in Cap layer (additive wt. % per 100% TPO formulation) | 1.7% Tinuvin XT-850 0.5% Tinuvin 328 0.5% Irgastab FS301 2% DLS 210 | 2% DLS210 only | 1.7% Tinuvin XT-850 0.5% Tinuvin 328 0.5% Irgastab FS301 | 1.7% Tinuvin XT-850 0.5% Tinuvin 328 0.5% Irgastab FS301 0.25% Irganox 1010 |
| Reinforced Scrim Core Layer Compositions | Polyester Same compositions as Comparative Example-A | Polyester TPO resins $TiO_2$ Fire retardant UV stabilizer package Color pigments | Polyester Same compositions as Comparative Example-A | Polyester Same compositions as Comparative Example-A |
| Days to cap cracks with 280 F. Oven Test | 184 days | 25 days | 74 days | 132 days |
| Thermal Resistance Improvement % over comparative example-A |  | 636% |  |  |
| Thermal Resistance Improvement % over comparative example-B |  | 149% |  |  |
| Thermal Resistance Improvement % over comparative example-C |  | 39% |  |  |

Comparing heat-resistant formulation 1 to comparative example A, which includes only ultrafine $TiO_2$ in its UV stabilizer package, the data in Table 1 shows that heat-resistant formulation 1 improves the heat resistance by 636%. The heat-resistance data for comparative examples B and C shows that while a conventional UV stabilizer package comprising three or four different components may provide some heat resistance, the addition of ultrafine $TiO_2$ synergistically allows for at least a 39% improvement in heat resistance.

According to an embodiment of the present disclosure, an exemplary heat-resistant formulation comprises TPO resins and a UV stabilizer package that includes 0.25-2 weight percent ultrafine $TiO_2$. According to another embodiment of the present disclosure, an exemplary heat-resistant formulation comprises TPO resins and a UV stabilizer package that includes 0.5-2 weight percent ultrafine $TiO_2$. According to yet another embodiment of the present disclosure, an exemplary heat-resistant formulation comprises TPO resins and a UV stabilizer package that includes 1.5-2 weight percent ultrafine $TiO_2$.

Shown in Table 2 is the correlation between the amount of ultrafine $TiO_2$ and the corresponding effectiveness in resisting heat-induced degradation. Exemplary heat-resistant formulations 2-5 are identical except the amount of ultrafine $TiO_2$ (DLS210) is increased from 0.5% to 2%. The days it took for cracks to develop did not increase linearly with increases in the concentration of ultrafine $TiO_2$. While each formulation still provides improved heat resistance over comparative examples D and E, there appears to be an optimal heat resistance at around 1.5% to 2% ultrafine $TiO_2$.

TABLE 2

Thermal Resistance of 60 mil TPO Membrane

|  | Heat-resistant Formulation 2 | Heat-resistant Formulation 3 | Heat-resistant Formulation 4 | Heat-resistant Formulation 5 | Comparative Example-D | Comparative Example-E |
|---|---|---|---|---|---|---|
| Cap Layer Compositions | TPO resins 3% Rutile $TiO_2$ Fire retardant Novel UV stabilizer package-2 | TPO resins 3% Rutile $TiO_2$ Fire retardant Novel UV stabilizer package-3 | TPO resins 3% Rutile $TiO_2$ Fire retardant Novel UV stabilizer package-4 | TPO resins 3% Rutile $TiO_2$ Fire retardant Novel UV stabilizer package-5 | TPO resins 3% Rutile $TiO_2$ Fire retardant UV stabilizer package-D | TPO resins 3% Rutile $TiO_2$ pigment Fire retardant UV stabilizer package-E |
| UV stabilizer package in Cap | 0.34% Tinuvin XT-850 | 0.34% Tinuvin XT-850 | 0.34% Tinuvin XT-850 | 0.34% Tinuvin XT-850 | 2% DLS210 only | 0.34% Tinuvin XT-850 |

TABLE 2-continued

Thermal Resistance of 60 mil TPO Membrane

| | Heat-resistant Formulation 2 | Heat-resistant Formulation 3 | Heat-resistant Formulation 4 | Heat-resistant Formulation 5 | Comparative Example-D | Comparative Example-E |
|---|---|---|---|---|---|---|
| layer (additive wt. % per 100% TPO formulation) | 0.75% Uvasorb HA88FD 0.1% Tinuvin 328 0.1% Irgastab FS301 0.25% Irganox 1010 0.5% DLS210 | 0.75% Uvasorb HA88FD 0.1% Tinuvin 328 0.1% Irgastab FS301 0.25% Irganox 1010 1.0% DLS210 | 0.75% Uvasorb HA88FD 0.1% Tinuvin 328 0.1% Irgastab FS301 0.25% Irganox 1010 1.5% DLS210 | 0.75% Uvasorb HA88FD 0.1% Tinuvin 328 0.1% Irgastab FS301 0.25% Irganox 1010 2.0% DLS210 | | 0.75% Uvasorb HA88FD 0.1% Tinuvin 328 0.1% Irgastab FS301 0.25% Irganox 1010 |
| Reinforced Scrim | Polyester | Polyester | Polyester | Polyester | Polyester | Polyester |
| Core Layer Compositions | Same compositions as Comparative Example D | Same compositions as Comparative Example D | Same compositions as Comparative Example D | Same compositions as Comparative Example D | TPO resins $TiO_2$ Fire retardant UV stabilizer package Color pigments | Same compositions as Comparative Example D |
| Days to cap cracks with 280 F. Oven Test | 139 days | 139 days | 154 days | 150 days | 25 days | 81 days |
| Thermal Resistance Improvement % over comparative example-D | 456% | 456% | 516% | 500% | | |
| Thermal Resistance Improvement % over comparative example-E | 72% | 72% | 90% | 85% | | |

It is to be appreciated that the optimal range of concentration of ultrafine $TiO_2$ may vary as the composition of the UV stabilizer package varies. It is to be further appreciated that the optimal concentration of ultrafine $TiO_2$ may vary as the mean particle size of the ultrafine $TiO_2$ varies. Ultrafine $TiO_2$ suitable for the formulations of the present disclosure may have a mean particle size of 165 nm or less. In an embodiment, ultrafine $TiO_2$ having a mean particle size between 125 to 150 nm may be used. In another embodiment, ultrafine $TiO_2$ having a mean particle size between 110 to 165 nm may be used. It is to be appreciated that the embodiments provide herein are merely exemplary, and may be adjusted in accordance with the principles of the present disclosure.

Turning back to FIG. 1, the cap layer 102 may be formulated according to any of the heat-resistant TPO formulations disclosed in the present disclosure. In an embodiment, the entirety of the cap layer 102 may formulated with the heat-resistant TPO formulation of the present disclosure. In another embodiment, only a portion of the cap layer 102 is formulated with the heat-resistant TPO formulation of the present disclosure. For example, the cap layer 102 may include a first sub-layer (not shown) adjacent to the outer surface of the cap layer 102, and in an embodiment, the cap layer 102 may be configured to have the first sub-layer formulated with the heat-resistant TPO formulation of the present disclosure.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A heat-resistant thermoplastic polyolefin roofing or geothermal membrane, the thermoplastic polyolefin roofing comprising:
   a cap layer comprising a first thermoplastic polyolefin composition, the first thermoplastic polyolefin composition comprising
      thermoplastic polyolefin resins,
      rutile titanium dioxide having a mean particle size of at least 250 nm, and
      a UV stabilizer package;
   a core layer made of a second thermoplastic polyolefin composition; and
   a scrim layer disposed between the cap layer and the core layer,
   wherein the UV stabilizer package of the first thermoplastic polyolefin composition comprises an ultraviolet light stabilizer, a process stabilizer, an ultraviolet light absorber, and from 0.001 weight percent to 3 weight percent ultrafine titanium dioxide having a mean particle size of 165 nm or less, and
   wherein the cap layer of the heat-resistant thermoplastic polyolefin roofing or geothermal membrane at a thickness of about 80 mil resists cracking for about 184 days at a temperature of about 280 F.

2. The thermoplastic polyolefin roofing membrane of claim 1, wherein the first thermoplastic polyolefin composition comprises from 1 to 10 weight percent of the rutile titanium dioxide.

3. The thermoplastic polyolefin roofing membrane of claim 2 wherein the first thermoplastic polyolefin composition comprises from 2 to 4 weight percent of the rutile titanium dioxide.

4. The thermoplastic polyolefin roofing membrane of claim 1, wherein the UV stabilizer package further comprises at least one of the following: an antioxidant, and thermal stabilizer.

5. The thermoplastic polyolefin roofing membrane of claim 1, wherein the UV stabilizer package further comprises an antioxidant, and thermal stabilizer.

6. The thermoplastic polyolefin roofing membrane of claim 1, wherein the UV stabilizer package of the first thermoplastic polyolefin composition comprises from 0.5 weight percent to 2 weight percent ultrafine titanium dioxide.

7. The thermoplastic polyolefin roofing membrane of claim 6, wherein the UV stabilizer package of the first thermoplastic polyolefin composition comprises from 1.5 weight percent to 2 weight percent ultrafine titanium dioxide.

8. The thermoplastic polyolefin roofing membrane of claim 1, wherein the ultrafine titanium dioxide has a mean particle size ranging from 110 to 165 nanometers.

9. The thermoplastic polyolefin roofing membrane of claim 8, wherein the ultrafine titanium dioxide has a mean particle size ranging from 125 to 150 nanometers.

10. The thermoplastic polyolefin roofing membrane of claim 1, wherein the core layer is made of a second thermoplastic polyolefin composition having a UV stabilizer package, wherein the UV stabilizer package of the first thermoplastic polyolefin composition is different from the UV stabilizer package of the second thermoplastic polyolefin composition.

11. The thermoplastic polyolefin roofing membrane of claim 1, wherein the core layer is made of a second thermoplastic polyolefin composition, the first and second formulated thermoplastic polyolefin compositions comprising substantially the same UV stabilizer package.

12. A heat-resistant thermoplastic polyolefin composition, the composition comprising:
   a thermoplastic polyolefin resin;
   rutile titanium dioxide having a mean particle size of at least 250 nm, and
   a UV stabilizer package comprising an ultraviolet light stabilizer, a process stabilizer, an ultraviolet light absorber, and 0.001 weight percent to 3 weight percent ultrafine titanium dioxide having a mean particle size of 165 nm or less,
   wherein the heat-resistant thermoplastic polyolefin composition at a thickness of about 80 mil resists cracking for about 184 days at a temperature of about 280 F.

13. The thermoplastic polyolefin composition of claim 12, further comprising 2 to 4 weight percent of the rutile titanium dioxide.

14. The thermoplastic polyolefin composition of claim 12, wherein the UV stabilizer package further comprises at least one of the following: an antioxidant, and thermal stabilizer.

15. The thermoplastic polyolefin composition of claim 12, wherein the UV stabilizer package of the first thermoplastic polyolefin composition comprises from 0.5 weight percent to 2 weight percent ultrafine titanium dioxide.

16. The thermoplastic polyolefin composition of claim 15, wherein the UV stabilizer package of the first thermoplastic polyolefin composition comprises from 1.5 weight percent to 2 weight percent ultrafine titanium dioxide.

17. A method of manufacturing a heat-resistant thermoplastic polyolefin membrane, the method comprising:
   providing a first thermoplastic polyolefin mixture comprising a thermoplastic polyolefin resin, rutile titanium dioxide having a mean particle size of at least 250 nm, and a UV stabilizing package comprising an ultraviolet light stabilizer, a process stabilizer, an ultraviolet light absorber, and 0.001 weight percent to 3 weight percent ultrafine titanium dioxide; and
   extruding a first thermoplastic polyolefin layer from the first thermoplastic polyolefin mixture,
   wherein ultrafine titanium dioxide has a mean particle size of 165 nm or less, and
   wherein the heat-resistant thermoplastic polyolefin membrane at a thickness of about 80 mil resists cracking for about 184 days at a temperature of about 280 F.

18. The method of claim 17, further comprising:
   providing a second thermoplastic polyolefin mixture;
   extruding a second thermoplastic polyolefin layer from the second thermoplastic polyolefin mixture;
   disposing a scrim layer between the first and second thermoplastic polyolefin layer;
   laminating the first thermoplastic polyolefin layer, the scrim layer, and the second thermoplastic polyolefin layer at an elevated temperature, wherein first and second thermoplastic polyolefin layers are fused through interstices of the scrim layer.

19. The method of claim 17, wherein the UV stabilizer package comprises from 0.5 weight percent to 2 weight percent of the ultrafine titanium dioxide.

20. The method of claim 19, wherein the UV stabilizer package of the first thermoplastic polyolefin composition comprises from 1.5 weight percent to 2 weight percent of the ultrafine titanium dioxide.

* * * * *